(12) United States Patent
Welsh et al.

(10) Patent No.: US 9,871,295 B2
(45) Date of Patent: Jan. 16, 2018

(54) MULTI-SCALE, MULTI-LAYER DIODE GRID ARRAY RECTENNA

(75) Inventors: Raphael J Welsh, Powell, OH (US); Larry J House, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 1149 days.

(21) Appl. No.: 14/006,225

(22) PCT Filed: Mar. 26, 2012

(86) PCT No.: PCT/US2012/030526
§ 371 (c)(1),
(2), (4) Date: Nov. 20, 2013

(87) PCT Pub. No.: WO2012/135096
PCT Pub. Date: Oct. 4, 2012

(65) Prior Publication Data
US 2014/0290950 A1    Oct. 2, 2014

Related U.S. Application Data

(60) Provisional application No. 61/467,470, filed on Mar. 25, 2011.

(51) Int. Cl.
| | |
|---|---|
| E21B 43/00 | (2006.01) |
| H01Q 7/00 | (2006.01) |
| H01Q 1/24 | (2006.01) |
| H02J 17/00 | (2006.01) |
| H01L 45/00 | (2006.01) |

(52) U.S. Cl.
CPC ............... *H01Q 7/00* (2013.01); *E21B 43/00* (2013.01); *H01Q 1/248* (2013.01); *H02J 17/00* (2013.01)

(58) Field of Classification Search
CPC .............................. B01J 19/087; E21B 43/00
See application file for complete search history.

(56) References Cited

U.S. PATENT DOCUMENTS

| | | |
|---|---|---|
| 3,434,678 A | 3/1969 | Brown et al. |
| 4,297,708 A | 10/1981 | Vidal |
| 4,901,084 A | 2/1990 | Huguenin et al. |
| 4,943,811 A | 7/1990 | Alden et al. |

(Continued)

FOREIGN PATENT DOCUMENTS

| | | |
|---|---|---|
| EP | 325034 | 7/1989 |
| SU | 1094110 | 5/1984 |

OTHER PUBLICATIONS

Hagerty et al., "Broadband Rectenna Arrays for Randomly Polarized Incident Waves", European Microwave Conference, 2000, 30th, IEEE, Piscataway, NJ, USA, Oct. 1, 2000, pp. 1-4.

*Primary Examiner* — Zakiya W Bates
(74) *Attorney, Agent, or Firm* — Diederike & Whitelaw, PLC

(57) ABSTRACT

An antenna for receiving electromagnetic energy with multiple grid arrays includes first and second grid patterns of diodes each acting as a half-wave rectifying element when illuminated by the electromagnetic energy whereby the electromagnetic energy is efficiently converted into electrical current at an output even when the electromagnetic energy is randomly polarized. The multiple grid arrays are spaced from one another and can also be offset from one another. In accordance with an aspect of the invention, the first and second grid patterns of diodes have varying diode densities.

20 Claims, 6 Drawing Sheets

(56) References Cited

U.S. PATENT DOCUMENTS

| | | |
|---|---|---|
| 5,321,414 A | 6/1994 | Alden et al. |
| 5,430,369 A | 7/1995 | Bolomey et al. |
| 5,503,350 A | 4/1996 | Foote |
| 5,563,614 A | 10/1996 | Alden et al. |
| 5,574,471 A | 11/1996 | Sureau |
| 5,579,024 A | 11/1996 | Sureau |
| 5,621,423 A | 4/1997 | Sureau |
| 7,019,918 B2 | 3/2006 | Wallerstein et al. |
| 7,456,803 B1 | 11/2008 | Sievenpiper |
| 7,463,210 B2 | 12/2008 | Rawnick et al. |
| 7,782,255 B2 | 8/2010 | Sego |
| 8,020,805 B2 | 9/2011 | Choi et al. |
| 2009/0272420 A1 | 11/2009 | Kare |

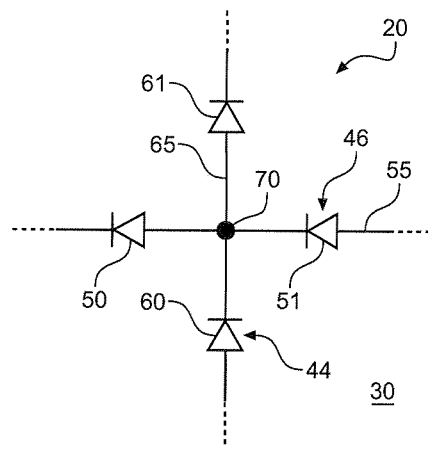
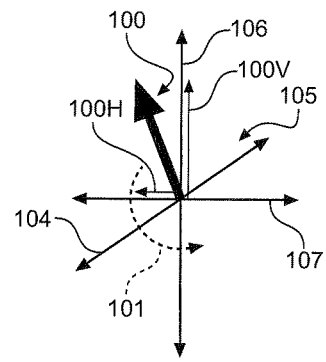
FIG. 2
PRIOR ART
FIG. 3
PRIOR ART
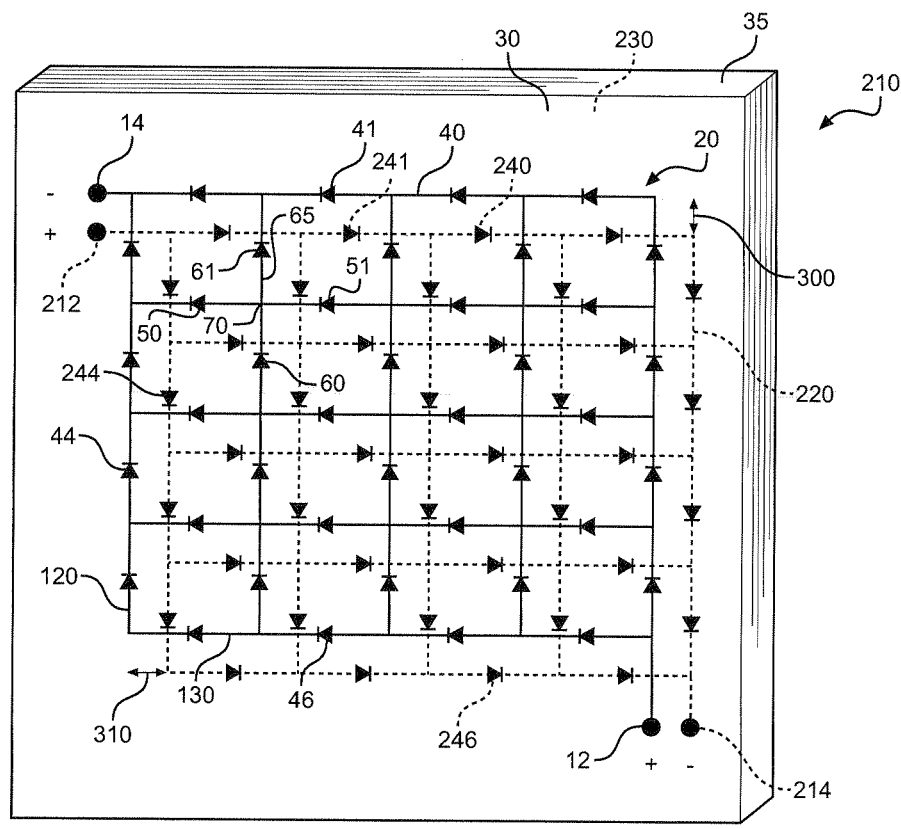
FIG. 4

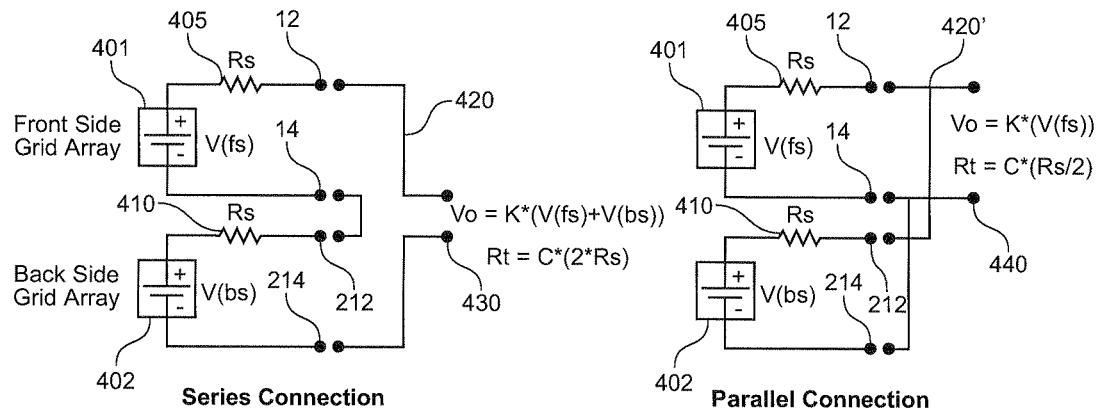
FIG. 5 FIG. 6
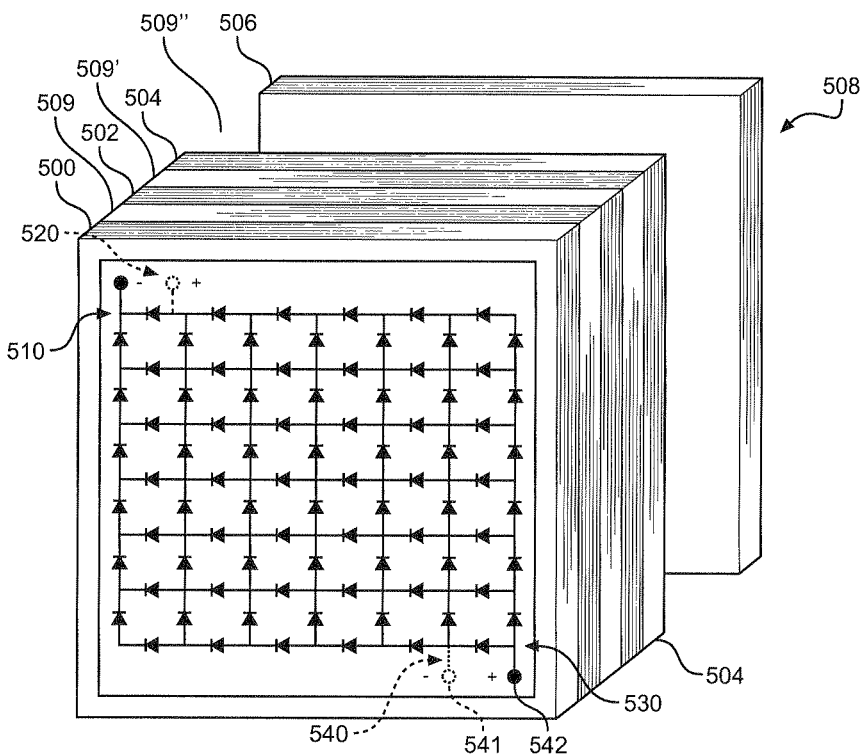
FIG. 7

MULTI-SCALE, MULTI-LAYER DIODE GRID ARRAY RECTENNA

CROSS REFERENCE TO RELATED APPLICATIONS

This application represents a National Stage application of PCT/US2012/030526 entitled "Multi-Scale, Multi-Layer Diode Grid Array Rectenna" filed Mar. 26, 2012, which claims the benefit of the U.S. Provisional Patent Application Ser. No. 61/467,470 filed Mar. 25, 2011, entitled "Multi-Scale, Multi-Layer Diode Grid Array Rectenna", the entire contents of which is incorporated herein by reference.

BACKGROUND OF THE INVENTION

Field of the Invention

The present invention pertains to the art of transmitting and receiving electromagnetic power using antennas to receive electromagnetic energy and, more particularly, to rectifying antennas that convert electromagnetic energy into direct electrical current.

Discussion of the Prior Art

Generally, a rectifying antenna, otherwise known as a "rectenna", is an antenna designed to convert electromagnetic energy, preferably microwave energy, into direct (DC) electrical current an thus acts as an energy converter. An example of an early use of a rectenna can be found in a crystal radio which converts RF energy, i.e., radio waves, into an electric current which is sent to a speaker to produce sound. Perhaps one of the most simple of rectennas is formed by placing a Schottky diode between the dipoles of an antenna. Often, rectennas are formed by multiple Schottky diodes linked together. Under certain favorable conditions, such antennas have been known to convert microwave energy into electrical current with an efficiency of over 90%.

Because rectennas are able to transmit power over a distance with high efficiency, they are commonly employed in solar powered satellites. Additionally, proposals have been made to use rectennas as part of a system to transfer energy to flying machines. For example, U.S. Pat. No. 3,434,678 discloses a combined antenna and conversion mechanism for the reception of beamed high frequency energy. Specifically, a full-wave bridge connected diode network is used as a rectenna to provide power to a helicopter. However, such an arrangement requires that the received energy be polarized and that the orientation of the applied field be maintained parallel to the orientation of the rectenna dipoles in order to maintain high efficiency in collecting power.

Another broadband rectenna system is formed from an array of traces loaded by Schottky diodes and is often referred to as a "Dense Diode Grid Array." With initial reference to FIG. 1, an energy converter such as a rectifying antenna or rectenna for receiving electromagnetic energy constructed is generally indicated at 10. Rectenna 10 has a positive terminal 12 and a negative terminal 14 which collectively constitute an electrical output. Rectenna 10 also has a grid array 20 that is located along a surface 30 of a substrate 35. Grid array 20 includes a grid pattern 40 of diodes 41. Diodes 41 are divided into a first group, represented by diode 44, of electrodes that extend in a first direction and a second group, represented by diode 46, of electrodes that extend in a second direction, perpendicular to the first direction. For the sake of convenience, the first and second directions are referred to as horizontal and vertical respectively, although it should be noted that Rectenna 10 might be positioned in various different orientations.

Referring now to FIG. 2, there is shown a portion of grid array 20. Two diodes 50, 51 are linearly aligned and arranged in series along a conductive horizontal trace 55 on surface 30. Similarly, two diodes 60, 61 are arranged in a linear fashion along a conductive vertical trace 65, also on surface 30. Vertical and horizontal traces 55, 65 share a common node 70.

As shown in FIG. 3, an electromagnetic field vector 100 is shown rotating by arrow 101 about an axis of rotation 104 (extending into and out of the page) and in a plane 105 extending in a vertical direction along vertical axis 106 and a horizontal direction along horizontal axis 107. Rotating electromagnetic field vector 100 is used to represent a randomly polarized electromagnetic wave of incident RF energy impinging on array 20. Rotating electromagnetic field vector 100 is continuously split into two orthogonal components 100V, 100H as vector 100 completes a cycle of rotation about axis 104. In this case, vertical component 100V of field vector 100 aligns with diodes 44 arranged vertically and, in a similar manner, horizontal component 100H aligns with diodes 46 arranged horizontally. Of course, grid array 20 will harvest energy from incident RF energy even if diodes 44 and 46 are not arranged at right angles, but the efficiency of harvesting will drop.

Turning back to FIG. 1, grid array 20 includes an entire dense rectangular grid pattern of diodes 44, 46 connected by nodes such as node 70. As such, numerous vertical traces 120 and horizontal traces 130 connect diodes 44, 46 to positive and negative terminals 12, 14. When vertical and horizontal traces 120, 130 are so arranged in array 20, the entire array 20 reacts to both components 100V, 100H of electromagnetic field vector 100. Electromagnetic forces are combined in array 20 giving a large DC voltage between terminals 12, 14, with junction capacitance minimizing any ripple voltage. Vertical and horizontal, diode-loaded, conductive traces 120, 130 alternately forward bias during each half cycle of rotating vector 100, allowing free charges to store up and aid in biasing adjacent orthogonal, diode-loaded traces 55, 65 during the next half of the cycle. Therefore, the dense rectangular grid pattern 40 of orthogonally oriented diodes 44, 46 will act as a half-wave rectifying element when illuminated by the incident RF energy represented by vector 100.

In general, such prior art broadband rectennas exhibit low efficiencies when harvesting RF energy from a randomly polarized illumination source. With the above in mind, there is considered to be various advantages associated with further developments for rectennas. In particular, there is seen to be a need in the art for a rectenna array that has increased power and efficiency along with a wide frequency response that is efficient at harvesting energy from a randomly polarized illumination source.

SUMMARY OF THE INVENTION

The present invention is directed to an apparatus comprising an energy converter such as a rectifying antenna or rectenna for receiving electromagnetic energy and converting the energy to DC current. The antenna includes an electrical output and a grid array including a grid pattern of diodes located substantially along a first surface and divided into a first group of serially connected diodes extending in a first direction and a second group of serially connected diodes extending perpendicular to the first direction. The grid array acts as a half-wave rectifying element when illuminated by electromagnetic energy. In addition, a second grid array is provided, including a second grid pattern of diodes located substantially along a second surface. The second grid array also acts as a half-wave rectifying element when illuminated by the electromagnetic energy. The first surface is spaced from the second surface. An electrical circuit connects the first and second arrays to the electrical output whereby the electromagnetic energy impinging on the first and second grid arrays is converted into electrical current at the output even when the electromagnetic energy is randomly polarized. In accordance with one aspect of the invention, the first grid array is offset from the second grid array. In accordance with another aspect, the number of diodes per unit area varies between the first and second grid arrays.

In another embodiment, grid arrays are located on opposite sides of a substrate having a low dielectric constant and additional substrates with additional grid layers, each having variable grid spacing, are mounted near the substrate. An electrical circuit connects the additional grid layers to the output in series or in parallel. The rectenna is used to power numerous devices such as a wireless detonator in a mining operation or batteries located on a soldier's vest used to power flashlights, radios and other portable gadgets.

Additional objects, features and advantages of the present invention will become more readily apparent from the following detailed description of preferred embodiments when taken in conjunction with the drawings wherein like reference numerals refer to corresponding parts in the several views.

BRIEF DESCRIPTION OF THE DRAWINGS

FIG. 2 shows a schematic view of a diode grid array element of FIG. 1;

FIG. 3 shows a rotating electromagnetic field vector representing an elliptically/randomly polarized electromagnetic wave;

FIG. 4 illustrates an embodiment with two planer arrays of diodes in spaced relationship on a single substrate;

FIG. 5 shows an electrical diagram for a combination front side grid array and back side grid array disposed on a single substrate and connected in series;

FIG. 6 shows an electrical diagram for a combination front side grid array and back side grid array disposed on a single substrate and connected in parallel;

FIG. 7 shows a perspective view of a multi-layer, dual sided, diode grid array;

DETAILED DESCRIPTION OF PREFERRED EMBODIMENTS

Figure 1:
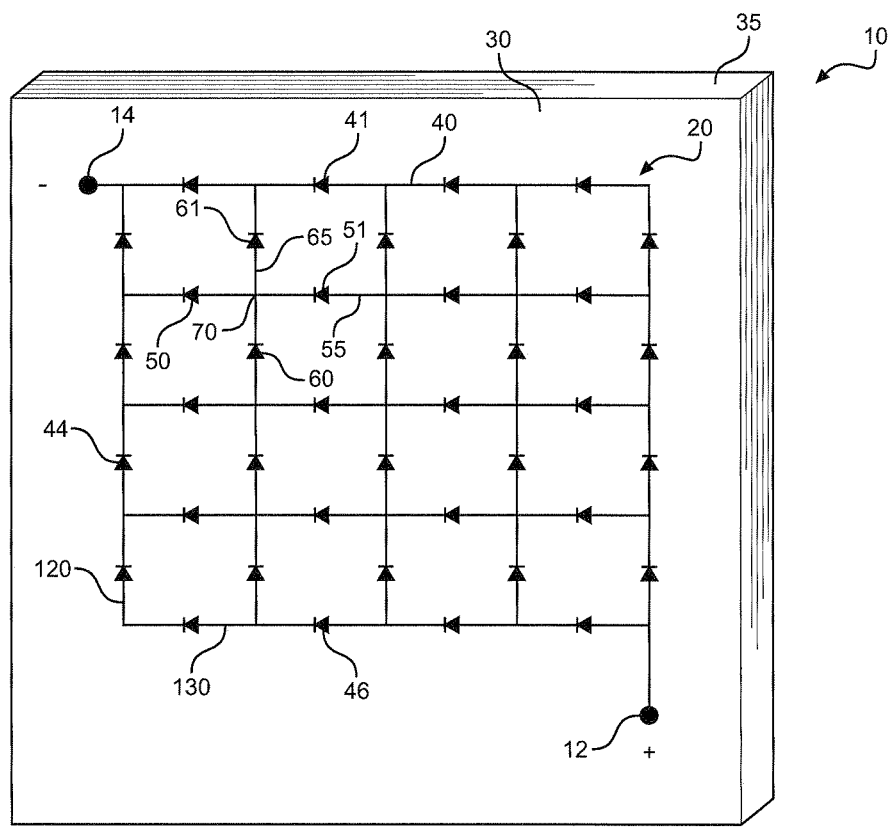
FIG. 1 shows a group of diode grid array elements linked together to form a planer array of diodes according to the prior art.

As shown in FIG. 4, a double-sided antenna 210 is shown in accordance with the invention. Double-sided antenna 210 is similar to energy converter or rectenna 10 shown in FIG. 1 and is mounted on substrate 35'. In addition to grid array 20, which is also referred to as a first grid array or a front side grid array, double-sided antenna 210 has a second grid array 220, also referred to as a backside array. Second grid array 220 includes a positive terminal 212 and a negative terminal 214 and is mounted on an opposite surface 230, spaced from surface 30 of substrate 35'. Second grid array 220 also includes a grid pattern 240 of diodes that is divided into a first group 244 of electrodes that extend in the first direction and a second group 246 of electrodes that extend in the second direction. Double sided antenna 210 extends the capability of the single-sided, one unit operation of antenna 10 to a dual-sided multiple unit module where inherent electrical parameters like output voltage, source impedance and frequency response are tuned to a user's application. Substrate 35' is preferably chosen to minimize absorption and reflection to penetrating RF energy. Preferably, substrate 35' is made of 20 mil thick Duroid having a relative dielectric constant of 2.2 and a loss tangent <0.001, but other low loss substrates with very low reflection coefficients can also be used. Diode grid arrays 20, 220 implemented on opposing sides of substrate 35' are spatially offset, by 12.7 mm for example, both vertically, as represented by arrow pair 300, and horizontally, as represented by arrow pair 310, and thus are independently illuminated by impinging RF energy.

Broadband rectenna 210 has a center frequency determined by the spatial period of grid array 20 and should be approximately 1/10th of the free space wavelength ($\lambda_0/10$) of the RF energy. Therefore, given a center frequency-of-interest, the overall physical size of grid array 20 will scale with the frequency such that there is an inverse relationship of decreasing physical size with increasing frequency. Diode density determines overall efficiency and is also scaled with center frequency, with an upper limit of approximately 160 diodes per wavelength squared.

The vertical and horizontal orientation of diodes 44, 46 determines the polarity of the output dc voltage at terminals 12, 14. Likewise, the orientations of backside diodes 244, 246 determine the polarity of the output voltage of backside array 220 at terminals 212, 214. Each array 20, 220 of FIG. 4 is preferably modeled as a separate battery 401, 402 with its source impedance as shown in FIGS. 5 and 6. Specifically, front side array 20 is modeled both by a battery 401 having a front side voltage V(fs) and a resistor 405 having an impedance value Rs. Similarly, back side array 220 is modeled both by a battery 402 having a back side voltage V(bs) and a resistor 410 having an impedance value Rs. In FIG. 5, a circuit 420 connects front side array 20 and backside array 220 in series to an output terminal 430, while in FIG. 6 a circuit 420' connects front side array 20 and backside array 220 in parallel to an output terminal 440.

An output voltage level V(os) and source impedance R(os) at terminal 430 are given by the equation:

$$V(os)=K \times (V(fs)+V(bs))$$

$$R(os)=C \times (2 \times Rs)$$

An output voltage level V(op) and source impedance R(op) at terminal 440 are given by the equations:

$$V(op)=K \times (V(fs))$$

$$R(op)=C \times (Rs/2)$$

In the equations for total source impedance (Ros), R(op) and output voltage V(os), V(op) with both configurations, there are scaling constants that arise (K,C) because of possible shadowing effects, non-matched characteristics of diodes 44, 46, 244, 246 and minor absorption/reflection losses of substrate 35.

As shown in FIG. 7, in order to increase harvested power and efficiency, some preferred embodiments employ multiple layers of arrays 500, 502, 504, 506 formed and connected in various configurations to include series, parallel and series/parallel combinations. FIG. 7 shows an N layer, dual-sided diode grid array 508, separated by thin insulators 509, 509' which can be made of the same substrate as the array or can simply be constructed by an air gap 509". Each layer has a front side 510 and a backside 520 (only one of each being labeled) with a front side array 530 and a backside array 540 (again only one of each shown labeled) being printed thereon and spatially offset from each other. Each layer has two terminal connections for +/− polarities, with only terminals 541, 542 being labeled. The layers are preferably connected by either external wiring for field adaptability or internal connections for a specific static configuration. Series, parallel and series/parallel combinations are possible, whereby output voltages and source impedances are determined and dependent upon the characteristics of an illuminating RF wave. This arrangement increases apparent efficiency while keeping the same two-dimensional footprint as arrays 20, 220. Scaling factors K, C become more of a consideration as additional layers are added. In general, the fractional value of these scaling factors are estimated based on the analysis of empirical data. As several layers 500, 502, 504, 506 of dual-sided diode grid arrays are added, more distinct combinations are possible.

The standard one-sided, single plate grid array 20 exhibits a broadband frequency response whose center frequency (fo) is determined by the diode grid spacing and the relative dielectric constant of substrate 35 upon which array 35 is mounted as mentioned above. However, the use of the low-loss, thin substrates basically negates any center-frequency dependency on substrate 35'. Therefore, the spatial period of the grid array 20 will determine the center frequency. If all the grid arrays, for example those shown in FIG. 7, have the same spatial periodicity, the efficiency peaks at the center frequency and decreases somewhat abruptly within +/−30% of the center frequency as seen by trace 610 in the graph 600 shown in FIG. 8.

Figure 8:
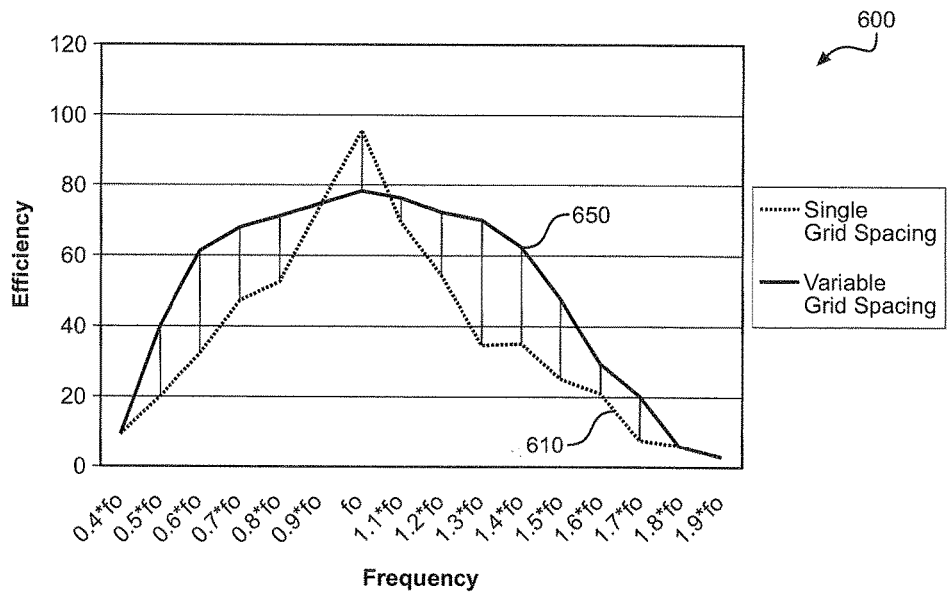
FIG. 8 is a graph of frequency response versus efficiency setting forth a grid spacing comparison.

Using different spatial periodicities for each array, a broader and flatter frequency response results as indicated in FIG. 8 by the "Variable Grid Spacing" trace 650 in the graph. The response represented by trace 650 is typical for a two layer, dual-sided (4 arrays total), diode grid array antenna designed with each array having a different spatial periodicity. The maximum efficiency peaks "wash-out" due to the scattered, but close proximity center frequencies. Since, in theory, the number of layers N could be very large, the broadening of the frequency response would correlate with the number of center frequencies desired. As an example, the two layer grid array mentioned above could be designed where $S_{mn}$ is the spatial periodicity for the $m^{th}$ layer, $n^{th}$ side, and $S_0$ is the overall nominal center frequency. In such a case, the spatial periodicities are as follows:

$S_{11} = \lambda_{11}/10 = 0.8 * \lambda_0/10$ or 80% of the nominal center frequency ($S_0$)

$S_{12} = \lambda_{12}/10 = 0.9 * \lambda_0/10$ or 90% of the nominal center frequency ($S_0$)

$S_{21} = \lambda_{21}/10 = 1.1 * \lambda_0/10$ or 110% of the nominal center frequency ($S_0$)

$S_{22} = \lambda_{22}/10 = 1.2 * \lambda_0/10$ or 120% of the nominal center frequency ($S_0$)

Figure 9:
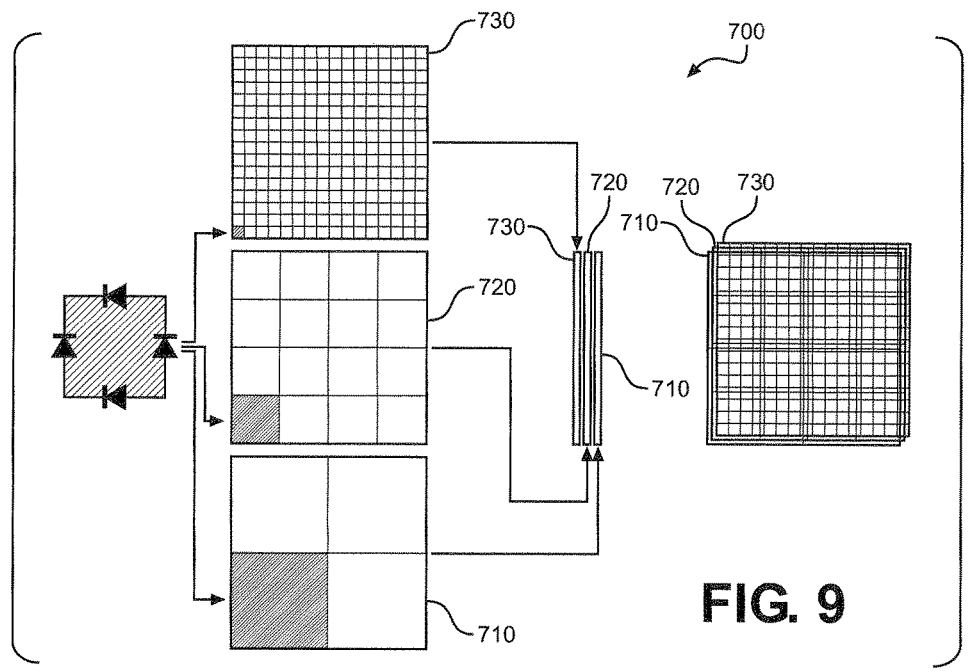
FIG. 9 is an exploded and side view of a multilayer, dual sided, diode grid array with three layers constructed in accordance with the invention.

The frequency responses for these four arrays would overlap, thus broaden the overall response of the module. For narrower, but higher peak efficiencies, the fractional difference in grid spacing between arrays is minimized. To this end, a multi-layer, multi-scale diode grid array rectenna 700 is illustrated in FIG. 9. Specifically, rectenna 700 has a first layer 710 with 12 diodes, a second layer 720 with 125 diodes, and a third layer 730 with 544 diodes. This multi-layered, varied diode density approach increases the physical size only in the third dimension and maintains a constant two dimensional footprint which results in high efficiencies and a widening of the frequency response, all controlled by the grid configuration.

Figure 10:
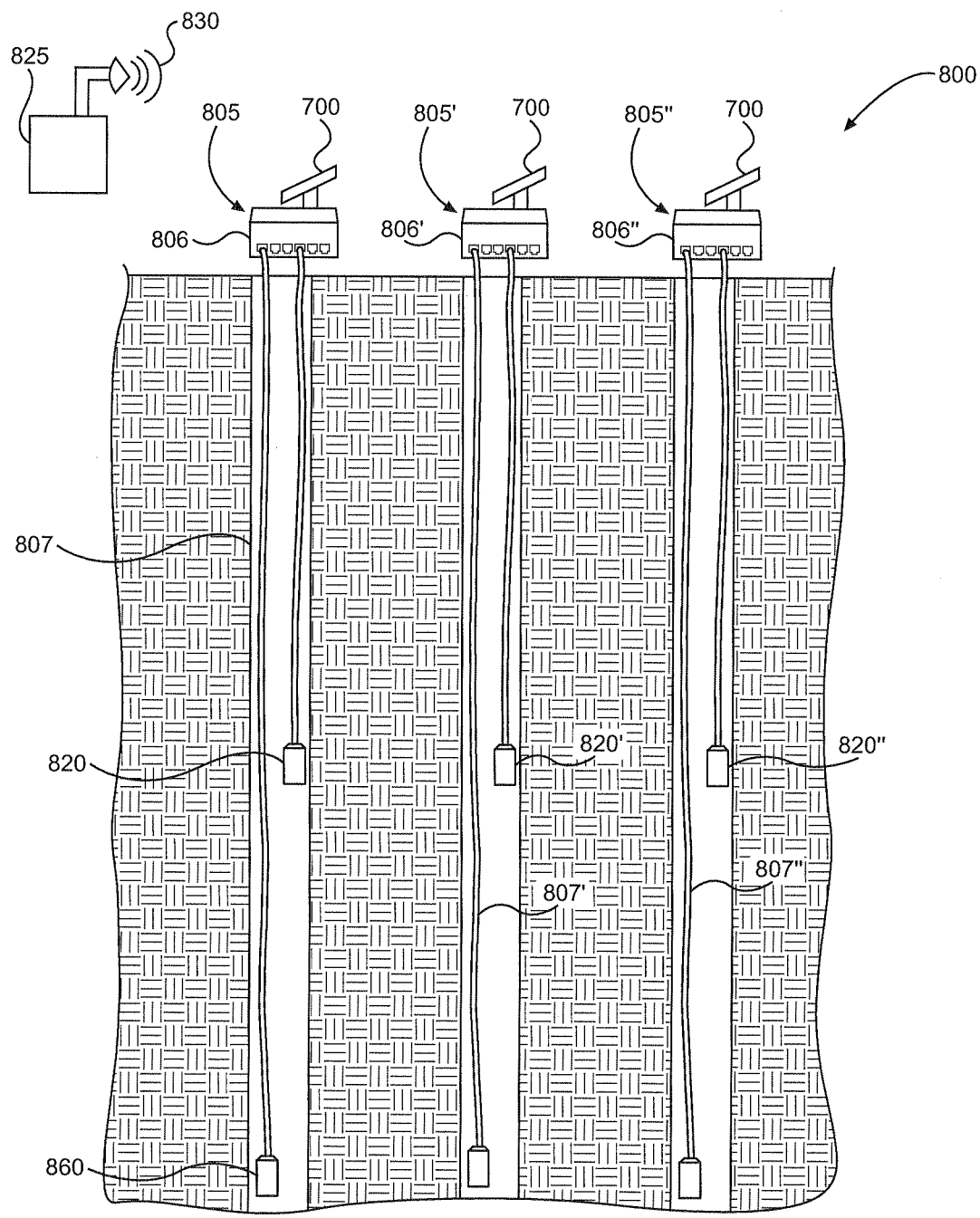
FIG. 10 is a cross-sectional view of a dual sided diode grid array constructed in accordance with the invention arranged to power a wireless detonator system for mining.

FIG. 10 shows a series of an energy converters or rectennas 700 employed in an overall mining system 800 used to power wireless detonators 805, 805', 805" in a mining operation. More specifically, rectenna 700 is attached to a wireless detonator controller 806 placed at the top of a bore hole 807 and electrically connected to a wire 810 that runs down bore hole 807. Wire 810 is then either electrically connected or, preferably, inductively connected to a detonator module 820 positioned part way down bore hole 807. Detonator module 820 has no battery or other power source and is therefore safe to handle during an explosives loading operation. After bore hole 807 and bore holes 807', 807" are all loaded, blasting personnel vacate the mining area and then remotely activate an overall blast controller 825 to begin broadcasting a signal 830 on an appropriate frequency to couple with wireless controller 806.

Wireless controllers 806, 806', 806" are provided at bore holes 807, 807', 807" respectively. Wireless controllers 806, 806', 806" are preferably able to collect and provide power to detonator modules 820, 820', 820", 860 and are also able to provide an RF signal 830 for programming a firing delay time for each detonator module 820, 820', 820". This is particularly important for vibration control in blasting operations for mining applications. In this application, overall blast controller 825 performs dual functions of powering detonator modules 820, 820', 820", 860 remotely while using the same RF signal 830 for 2-way data communications.

The ability to remotely provide both power and communication signals to wireless controllers 806, 806', 806" without the use of surface wires represents a significant advancement in mining technology and efficiency. The wireless arrangement of system 800 is designed to free personnel from the hole-to-hole wiring required by prior art systems. This feature offers a significant time advantage over all other systems where wiring can consume significant labor costs. In addition, the wireless arrangement of system 800 leaves the surface free from the clutter of wiring networks. It also eliminates the potential for wiring mistakes, as well as the potential of entanglement with personnel and blasting equipment used during the loading process.

Figure 11:
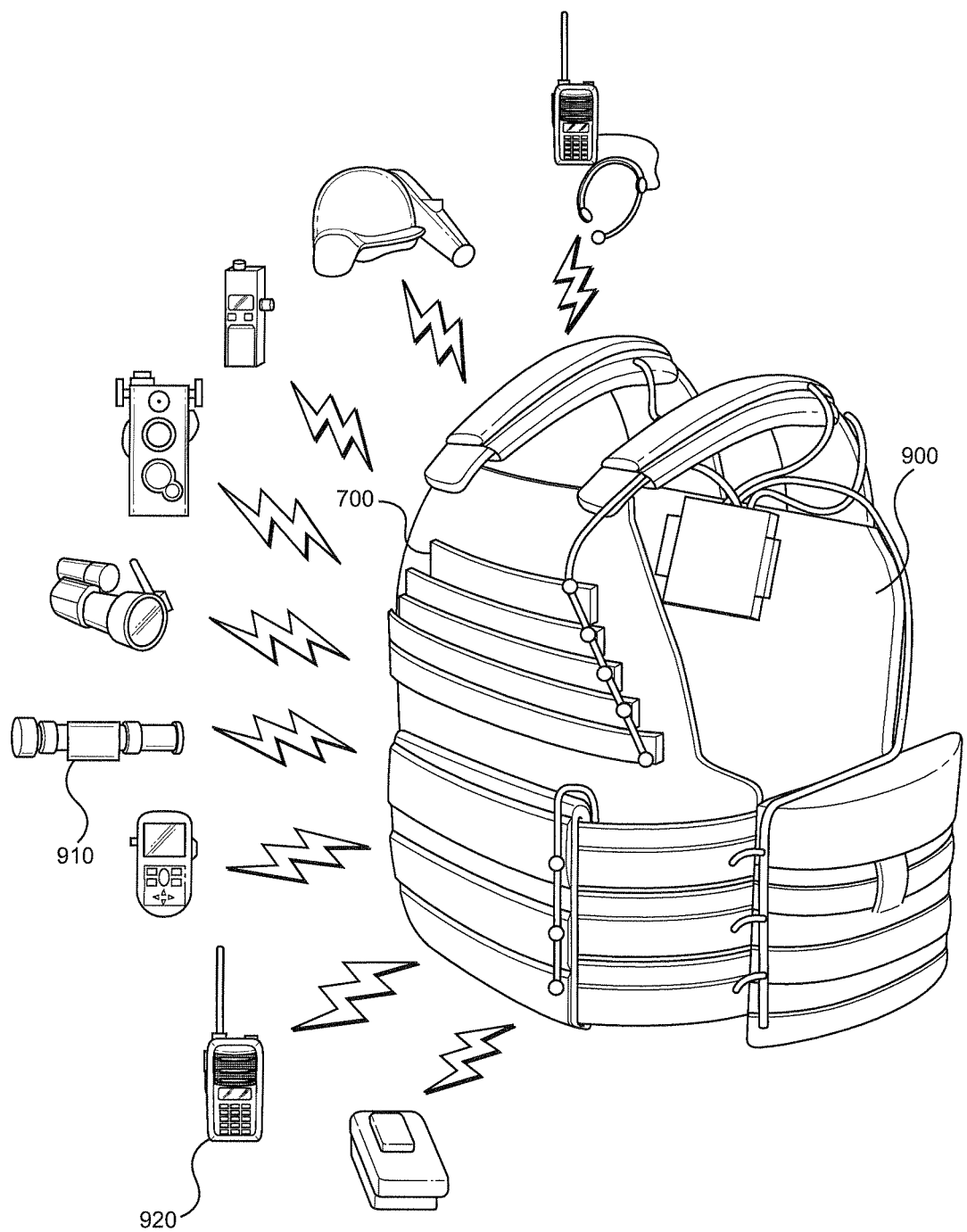
FIG. 11 is an isometric view of a dual sided diode grid array arranged on a vest to power devices carried by a soldier.

FIG. 11 illustrates another potential use for rectenna 700. That is, as shown, rectenna 700 is mounted on a vest 900 adapted to be worn by a soldier in order to wirelessly provide power to various electrically powered devices, such as a flashlight 910 or a radio 920. More specifically, electromagnetic fields are transmitted from a network of transmitting antennae to rectenna 700 on the soldier's vest 900. Output from rectenna 700 is employed to recharge battery powered devices 910, 920 carried by the soldier.

Although described with reference to preferred embodiments of the invention, it should be readily understood that various changes and/or modifications can be made to the invention without departing from the spirit thereof. For instance, the invention relates to a rectenna device that may be used in a wireless battery charging device for use in a wide range of commercial applications. The rectenna is an enabling technology across many markets, for example: wireless sensors and actuators for buildings, machinery, and engines; heavy equipment diagnostics; safety and security monitoring for: roads, bridges, rail, and mass transit; gas, oil, and electric transmission lines and equipment; long life MASINT and HUMINT sensors; data exfiltration; surveillance devices; electronic equipment such as laptops, e-books, mobile phones, calculators, toys, electronic car keys, and electronic apparel; and medical components associated with implants, ingestible diagnostic sensors, disposable testers, drug delivery and the like. In any event, the invention is only intended to be limited by the scope of the following claims.

The invention claimed is:

1. An apparatus comprising:
an energy convertor for receiving electromagnetic energy and converting the electromagnetic energy into electrical current, said energy converter including:
an antenna including a first grid array including a first grid pattern of diodes located substantially along a first surface, with the first grid array acting as a half-wave rectifying element when illuminated by the electromagnetic energy, and a second grid array including a second grid pattern of diodes located substantially along a second surface, with the second grid array acting as a half-wave rectifying element when illuminated by the electromagnetic energy, wherein the first surface is spaced from the second surface; and
an electrical circuit connecting the first and second arrays to an electrical output whereby the electromagnetic energy impinging on the first and second grid arrays is converted into electrical current at an output, wherein the energy converter is configured such that at least one of: the first grid array is offset from the second grid array; and the first grid pattern of diodes has a different diode density from the second grid pattern of diodes.

2. The apparatus according to claim 1, further comprising a substrate having a low dielectric constant and a low reflection coefficient, said first and second surfaces being on the substrate.

3. The apparatus according to claim 2, wherein the substrate is made of Duroid, is approximately 20 mil thick and has a relative dielectric constant of approximately 2.2 and a loss tangent <0.001.

4. The apparatus according to claim 2, wherein the first and second grid arrays are provided on opposite sides of the substrate.

5. The apparatus according to claim 4, further comprising additional substrates with additional grid layers having variable grid spacing mounted near the substrate.

6. The apparatus according to claim 5, wherein the electrical circuit connects the additional grid layers to the output in series.

7. The apparatus according to claim 5, wherein the electrical circuit connects the additional grid layers to the output in parallel.

8. The apparatus according to claim 5, wherein the electrical circuit connects the additional grid layers to the output with at least two of the additional grid layers connected in series and at least two of the additional grid layers connected in parallel.

9. The apparatus according to claim 1, wherein the first grid array is offset from the second grid array so as to be independently illuminated by the electromagnetic energy.

10. The apparatus according to claim 9, wherein the first grid array is offset from the second grid array in two orthogonal directions.

11. The apparatus according to claim 10, wherein the first grid array is offset from the second grid array by at least 12.7 mm in each of the two orthogonal directions.

12. The apparatus according to claim 1, wherein the first grid array includes a spatial period and a center frequency determined by the spatial period.

13. The apparatus according to claim 12, further comprising additional grid arrays with variable grid spacing and distinct special periodicity, whereby frequency responses of the additional arrays grid overlap, thereby broadening an overall frequency response of the antenna.

14. The apparatus according to claim 1, wherein the first grid pattern of diodes has a different diode density than the second grid pattern of diodes.

15. The apparatus of claim 1, further comprising a detonator system including a detonator module and a controller adapted to be connected to the output and powered by the electrical current.

16. The apparatus of claim 15, wherein the detonator system further includes a wire connecting the detonator module and the controller and wherein, during use, the detonator is placed down a bore hole, with the antenna receiving the electromagnetic energy and converting the electromagnetic energy to the electricity to power the controller and detonator module, whereby the detonator module does not include any battery or separate power source.

17. The apparatus of claim 1, further comprising:
a vest; and
a battery powered device mounted on the vest, wherein the energy converter is mounted on the vest adapted to wirelessly provide the battery powered device with energy.

18. A method comprising:
receiving electromagnetic energy with an antenna;
rectifying the electromagnetic energy with a first grid array including a first grid pattern of diodes located substantially along a first surface, with the first grid array acting as a half-wave rectifying element when illuminated by the electromagnetic energy, and a second grid array being offset from said first grid array, including a second grid pattern of diodes having a different grid density from the first grid pattern of diodes and being located substantially along a second surface, with the second grid array acting as a half-wave rectifying element when illuminated by the electromagnetic energy, wherein the first surface is spaced from the second surface thereby converting the electromagnetic energy into an electrical current; and
sending the electric current to an output through an electrical circuit connected to the first and second arrays.

19. The method of claim 18, further comprising providing the electric current to a detonator module and a detonator controller and using the antenna to send information to and from the controller.

20. The method of claim 18, further comprising providing the electric current to battery powered devices detachably mounted on a vest.

\* \* \* \* \*